(12) United States Patent
Kumagai

(10) Patent No.: US 12,340,645 B2
(45) Date of Patent: Jun. 24, 2025

(54) PAPER SHEET PROCESSING DEVICE

(71) Applicants: LAUREL BANK MACHINES CO., LTD., Tokyo (JP); LAUREL MACHINERY CO., LTD., Osaka (JP); LAUREL PRECISION MACHINES CO., LTD., Osaka (JP)

(72) Inventor: Hiroyuki Kumagai, Tokyo (JP)

(73) Assignees: LAUREL BANK MACHINES CO., LTD., Tokyo (JP); LAUREL MACHINERY CO., LTD., Osaka (JP); LAUREL PRECISION MACHINES CO., LTD., Osaka (JP)

( * ) Notice: Subject to any disclaimer, the term of this patent is extended or adjusted under 35 U.S.C. 154(b) by 346 days.

(21) Appl. No.: 17/764,703

(22) PCT Filed: Oct. 14, 2020

(86) PCT No.: PCT/JP2020/038782
§ 371 (c)(1),
(2) Date: Mar. 29, 2022

(87) PCT Pub. No.: WO2021/085139
PCT Pub. Date: May 6, 2021

(65) Prior Publication Data
US 2022/0351565 A1    Nov. 3, 2022

(30) Foreign Application Priority Data

Oct. 28, 2019    (JP) .................................. 2019-195463

(51) Int. Cl.
*G07D 11/235*    (2019.01)
*G05B 15/02*    (2006.01)
(Continued)

(52) U.S. Cl.
CPC ........... *G07D 11/235* (2019.01); *G05B 15/02* (2013.01); *G07D 7/12* (2013.01); *G07D 11/14* (2019.01);
(Continued)

(58) Field of Classification Search
CPC ........ G07D 11/235; G07D 7/12; G07D 11/14; G07D 11/18; G07D 11/50; G07D 2207/00;
(Continued)

(56) References Cited

U.S. PATENT DOCUMENTS 4,357,615 A  *  11/1982  Yoshiharu .............. G01D 15/00
                                                          15/210.1
5,545,884 A  *   8/1996  Seto ....................... G06K 7/084
                                                            235/493
(Continued)

FOREIGN PATENT DOCUMENTS

JP    H09140904 A  *  6/1997
JP    2004213051 A  *  7/2004
(Continued)

OTHER PUBLICATIONS

International Search Report for PCT/JP2020/038782, mailed Dec. 1, 2020, 4 pages.
(Continued)

*Primary Examiner* — Yongjia Pan
(74) *Attorney, Agent, or Firm* — Nixon & Vanderhye P.C.

(57) ABSTRACT

The present invention is provided with: an identifying portion that reads a plurality of pieces of identification information including the same unique information provided to a division card; and a control portion that determines that the division card is usable when the unique information obtained from each of the plurality of pieces of identification information match up, and that determines that the division (Continued)

card is unusable when the unique information does not match up. Since whether or not the division card is usable is determined on the basis of the matching up or non-matching up of the unique information of the plurality of pieces of identification information provided to the division card, it is possible to easily determine whether or not the division card is usable.

4 Claims, 4 Drawing Sheets

(51) Int. Cl.
  *G07D 7/12* (2016.01)
  *G07D 11/14* (2019.01)
  *G07D 11/18* (2019.01)
  *G07D 11/50* (2019.01)
(52) U.S. Cl.
  CPC .............. *G07D 11/18* (2019.01); *G07D 11/50* (2019.01); *G07D 2207/00* (2013.01); *G07D 2211/00* (2013.01)
(58) Field of Classification Search
  CPC .... G07D 2211/00; G05B 15/02; B65H 43/00; B65H 43/04; B65H 7/00; B65H 7/06; B65H 2701/1914; B65H 29/62; B65H 7/20; B65H 2553/00; B65H 2553/82; B07C 5/34; G06K 7/10861; G06K 15/403; G06K 5/00; G06K 5/02; G06K 7/00
  See application file for complete search history.

(56) References Cited

U.S. PATENT DOCUMENTS

| | | | | |
|---|---|---|---|---|
| 5,988,501 | A * | 11/1999 | Murakami | G06K 19/06009 235/494 |
| 6,398,106 | B1 * | 6/2002 | Ulvr | G06K 19/06028 235/375 |
| 8,239,060 | B2 * | 8/2012 | Tokushige | G07D 11/50 700/223 |
| 8,310,715 | B2 * | 11/2012 | Price | G06F 3/1243 358/1.18 |
| 9,038,909 | B2 * | 5/2015 | Price | G06K 17/0016 235/462.04 |
| 9,143,628 | B2 * | 9/2015 | Lotz | H04N 1/00047 |
| 9,238,565 | B2 * | 1/2016 | Miyashita | B65H 33/00 |
| 10,002,485 | B2 * | 6/2018 | Takeda | G07D 11/20 |
| 10,086,259 | B2 * | 10/2018 | Schmidt | B07C 5/3422 |
| 2001/0050247 | A1 | 12/2001 | Myer, Sr. | |
| 2009/0218401 | A1 * | 9/2009 | Moran | G09F 3/10 235/487 |
| 2010/0202680 | A1 | 8/2010 | Hamasaki et al. | |
| 2011/0095078 | A1 * | 4/2011 | Price | G06K 15/021 235/375 |
| 2013/0093175 | A1 * | 4/2013 | Appavu | G07D 7/0047 283/70 |
| 2014/0263615 | A1 * | 9/2014 | Deangelo | G07D 7/0043 235/375 |
| 2014/0284864 | A1 | 9/2014 | Miyashita | |
| 2015/0069700 | A1 * | 3/2015 | Schmidt | A63F 1/06 273/149 R |
| 2016/0358400 | A1 * | 12/2016 | Arikawa | G07D 7/202 |
| 2016/0371913 | A1 * | 12/2016 | Smith | G07D 11/009 |
| 2017/0116810 | A1 * | 4/2017 | Tsuji | B65H 39/11 |
| 2020/0020191 | A1 * | 1/2020 | Takahashi | G07D 11/16 |

FOREIGN PATENT DOCUMENTS

| | | |
|---|---|---|
| JP | 2008-250418 | 10/2008 |
| JP | 2014-186373 | 10/2014 |
| JP | 2017-084036 | 5/2017 |
| WO | 2009/040922 | 4/2009 |

OTHER PUBLICATIONS

Written Opinion of the ISA for PCT/JP2020/038782, mailed Dec. 1, 2020, 3 pages.
Extended European Search Report mailed Oct. 27, 2023 in European Application No. 20881704.9, 9 pages.

\* cited by examiner

PAPER SHEET PROCESSING DEVICE

TECHNICAL FIELD

The present invention relates to a paper sheet processing device that processes paper sheets such as banknotes.

This application is the U.S. national phase of International Application No. PCT/JP2020/038782 filed Oct. 14, 2020 which designated the U.S. and claims priority to JP Application No. 2019-195463, filed Oct. 28, 2019, the entire contents of each of which are incorporated herein by reference.

BACKGROUND ART

Conventionally, there has been known a paper sheet processing device that divides paper sheets into batch processing units by division cards to collectively process the paper sheets (see Patent Document 1).

The main surface portion of the division card may be provided with, for example, a barcode containing identification information. The division card is subject to machine processing together with paper sheets such as banknotes in a paper sheet processing device and used repeatedly. Therefore, the barcode of the division card may get dirty or the barcode may become faint due to long-term use. As a result, the paper sheet processing device may no longer be able to obtain information from the barcode, or may obtain erroneous information from the barcode. Therefore, if the division card becomes unusable due to grime or deterioration (fading), it is necessary to replace the division card.

PRIOR ART DOCUMENTS

Patent Documents

[Patent Document 1] Japanese Unexamined Patent Application Publication No. 2017-084036

DISCLOSURE OF THE INVENTION

Problems to be Solved by the Invention

However, the decision to replace the division card is left to the operator. The operator judges whether or not the division card is usable based on the dirtiness and deterioration (faintness) of the division card, but it is not easy to make this judgment accurately. Therefore, depending on the judgment of the operator, an abnormality in reading the division card may occur, and unnecessary work such as recounting may be performed.

Accordingly, an object of the present invention is to provide a paper sheet processing device capable of easily determining whether or not a division card is usable.

Means for Solving the Problems

To achieve the above objective, the paper sheet processing device of the present invention is provided with: an identifying portion that reads a plurality of pieces of identification information including the same unique information provided to a division card; and a control portion that determines that the division card is usable when the unique information obtained from each of the plurality of pieces of identification information match up, and that determines that the division card is unusable when the unique information does not match up.

Effects of the Invention

According to the present invention, it is possible to provide a paper sheet processing device capable of easily determining whether or not a division card is usable.

EMBODIMENTS FOR CARRYING OUT THE INVENTION

Figure 1:
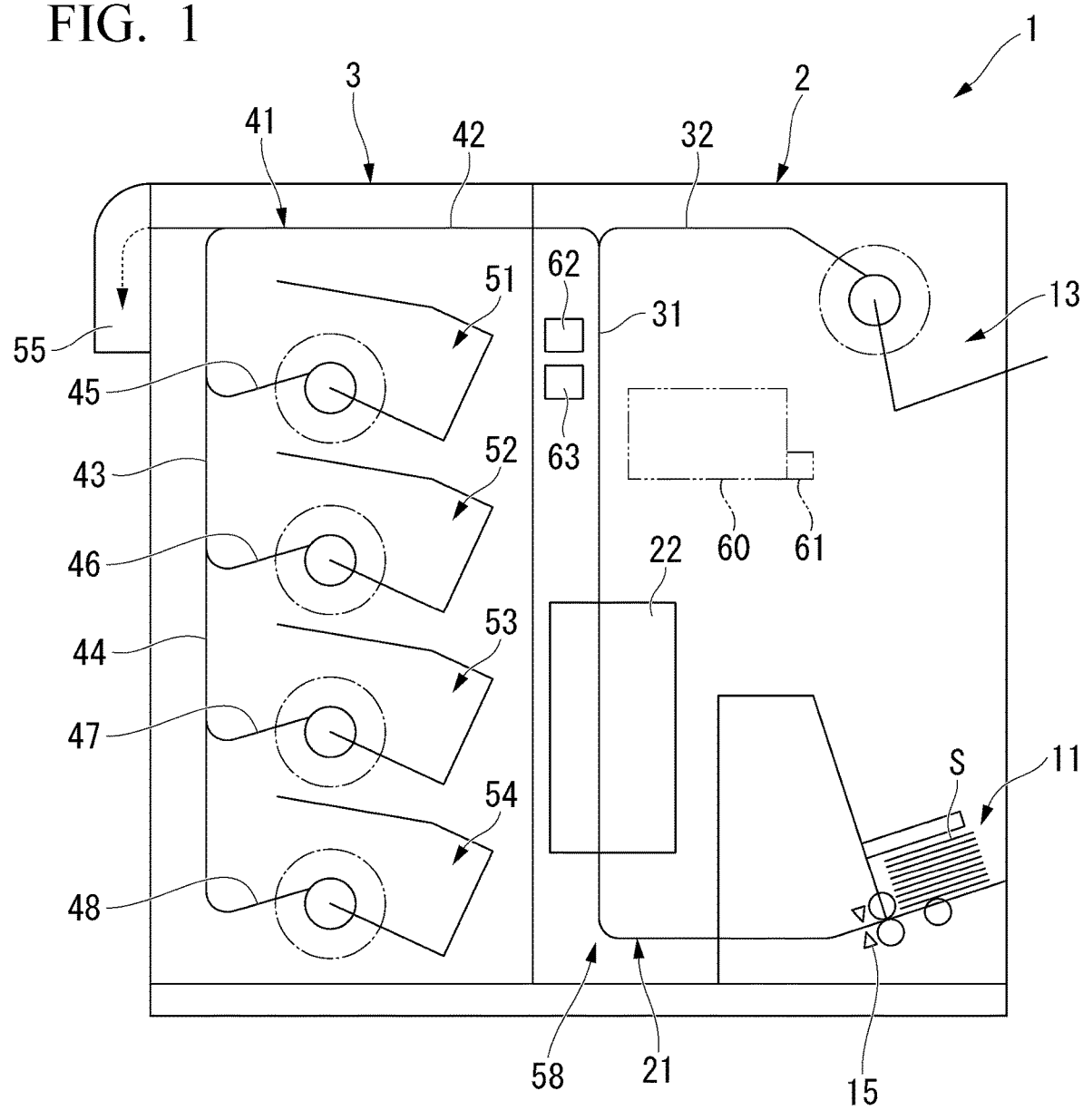
FIG. 1 is a cross-sectional view schematically showing a paper sheet processing device according to an embodiment of the present invention.

The paper sheet processing device according to the embodiment of the present invention will be described below with reference to the drawings. FIG. 1 shows the paper sheet processing device 1 of the present embodiment. The paper sheet processing device 1 classifies paper sheets such as banknotes, securities, and vouchers as paper sheets while counting them.

The paper sheet processing device 1 of the present embodiment classifies paper sheets S that have been charged into paper sheets to be counted, which are counting targets, and rejected paper sheets, which are not counting targets. The paper sheet processing device 1 further counts the sheets to be counted by type and accommodates the paper sheets by type, and displays the counting result and the accommodation destination in association with each other. In the following description, "front" denotes the operator side of the paper sheet processing device 1, "rear" is the side opposite to the operator of the paper sheet processing device 1, "right" is the right side when viewed from the operator of the paper sheet processing device 1, and "left" is the left side when viewed from the operator of the paper sheet processing device 1.

The paper sheet processing device 1 according to the embodiment is constituted by combining a counting unit 2 and a stacking unit 3. The counting unit 2 identifies and counts the paper sheets S. The stacking unit 3 performs a process of classifying, stacking and accommodating the paper sheets S counted by the counting unit 2 and conveyed from the counting unit 2. When the paper sheets S are banknotes, the stacking unit 3 can perform a process of stacking a predetermined number of the paper sheets S sorted for each denomination. The paper sheet processing device 1 can be configured by having a desired number of stacking units 3 continuously installed with respect to one counting unit 2. Here, a case where one stacking unit 3 is continuously installed with respect to one counting unit 2 will be described as an example.

The counting unit 2 has a receiving portion 11 at the lower portion thereof and a rejection portion 13 at the upper portion thereof. The receiving portion 11 is always open to the outside on the front surface and the right side surface. The rejection portion 13 is always open to the outside on the front surface and the right side surface.

The receiving portion 11 receives the paper sheets S charged from the outside of the paper sheet processing device 1. A plurality of the paper sheets S are set in the receiving portion 11 in a state of being stacked in the vertical direction, with the long sides oriented along the front and back and the short sides along the left and right. The receiving portion 11 separates and feeds out the paper sheets S in the stacked state set in this way one by one from the bottom paper sheet S to take the paper sheets into the paper sheet processing device 1. The paper sheets S fed out from the receiving portion 11 move along the extending direction of the short sides thereof. The receiving portion 11 is provided with a capture sensor 15 (identifying portion) for detecting the presence or absence of capture of the paper sheets S.

The counting unit 2 has in the interior thereof an endo-counting unit conveyance portion 21 and an identifying and counting portion 22 (identifying portion). The endo-counting unit conveyance portion 21 conveys the paper sheets S that have been charged into the receiving portion 11 and paid out from the receiving portion 11. The identifying and counting portion 22 (identifying portion) identifies and counts the paper sheets S being conveyed by the endo-counting unit conveyance portion 21.

The endo-counting unit conveyance portion 21 has a main conveyance path 31 and a branch conveyance path 32. The main conveyance path 31 extends from the receiving portion 11 toward the left side surface of the counting unit 2, then extends upward, and further extends toward the left side surface of the counting unit 2 and opens to the left side surface. The branch conveyance path 32 branches from the upper part of the main conveyance path 31, extends toward the right side surface of the counting unit 2, and is connected to the rejection portion 13. The identifying and counting portion 22 is provided on the receiving portion 11 side of the branch position of the branch conveyance path 32 in the main conveyance path 31.

An endo-stacking unit conveyance portion 41 is provided in the stacking unit 3. The endo-stacking unit conveyance portion 41 is connected to the main conveyance path 31 of the counting unit 2 and conveys the paper sheets S paid out from the main conveyance path 31. The endo-stacking unit conveyance portion 41 has a coupled conveyance path 42 and a branching conveyance path 43. The coupled conveyance path 42 opens at the upper part of the right side surface of the stacking unit 3, extends horizontally and linearly toward the left side surface of the stacking unit 3, and opens at the upper part of the left side surface. The branching conveyance path 43 branches downward from a left-side intermediate portion of the coupled conveyance path 42.

The branching conveyance path 43 of the stacking unit 3 has a downward extension portion 44 and a plurality of lateral extension portions 45, 46, 47, 48. The downward extension portion 44 branches from the middle portion on the left side of the coupled conveyance path 42 and extends vertically downward. The plurality of, specifically four, lateral extension portions 45, 46, 47, 48 extend from the downward extension portion 44 toward the right side surface of the stacking unit 3.

A first stacking portion 51, a second stacking portion 52, a third stacking portion 53, and a fourth stacking portion for stacking and accommodating the paper sheets S are respectively connected to the four lateral extension portions 45 to 48. Specifically, the uppermost first stacking portion 51 is connected to the uppermost lateral extension portion 45. The second stacking portion 52, which is the second from the top, is connected to the lateral extension portion 46 which is the second from the top. The third stacking portion 53, which is the third from the top, is connected to the lateral extension portion 47, which is the third from the top. The fourth stacking portion 54 on the lowermost side is connected to the lowermost lateral extension portion 48.

Among the paper sheets S identified and counted by the identifying and counting portion 22, the paper sheets S identified as those to be stored are stored in the stacking portions 51 to 54. For example, when the stacking unit 3 performs a process of stacking a predetermined number of banknotes sorted for each denomination, the denomination to be accommodated is set for each of the stacking portions 51 to 54, and the stacking portions 51 to 54 accommodate the banknotes of the target denominations that have been respectively set. Each of the stacking portions 51 to 54 has a pocket shape that is always open to the outside on the front surface of the stacking unit 3.

An evacuation pocket 55 capable of accommodating paper sheets S is provided at the end of the coupled conveyance path 42 on the opposite side of the counting unit 2. The evacuation pocket 55 accommodates overflow paper sheets S when any of the stacking portions 51 to 54 becomes full.

The endo-counting unit conveyance portion 21 and the endo-stacking unit conveyance portion 41, which are connected to each other, constitute an in-device conveying portion 58. The in-device conveying portion 58 conveys the paper sheets S paid out from the receiving portion 11 to each portion in the paper sheet processing device 1. When the paper sheets S being conveyed are identified by the capture sensor 15 and the identifying and counting portion 22, the in-device conveying portion 58 selectively sorts the paper sheets S to one of the rejection portion 13, the stacking portions 51 to 54, and the evacuation pocket 55 on the downstream side of the identifying and counting portion 22 on the basis of the identification results.

Among the paper sheets S taken into the paper sheet processing device 1 by the receiving portion 11, the rejection portion 13 stacks the paper sheets S that have been identified as rejected paper sheets other than the paper sheets to be counted by the identifying and counting portion 22, and accommodates the paper sheets S to be removable to outside the paper sheet processing device 1.

Among the paper sheets S taken into the paper sheet processing device 1 by the receiving portion 11, the stacking portions 51 to 54 stack by type the paper sheets S that have been counted by type by the identifying and counting portion 22 and accommodate the paper sheets S to be removable to outside the paper sheet processing device 1. For example, when processing banknotes as paper sheets S, the stacking portions 51 to 54 stack the banknotes by denomination.

An operation display portion 60 and a speech output portion 61 are provided on the front surface of the counting unit 2 of the paper sheet processing device 1. The operation display portion 60 receives operation inputs by an operator and displays information on a screen for the operator. The speech output portion 61 outputs audio by voice to the operator. A control portion 62 and a storage portion 63 are provided inside the counting unit 2. The control portion 62 controls the counting unit 2 and the stacking unit 3. The storage portion 63 stores a control program, various parameters, and the like. The control portion 62 controls the entire paper sheet processing device 1.

The identifying and counting portion 22 detects the image data on both surfaces of the paper sheet S and, by comparing each with reference data, specifies the type of reference data that can be determined as matching up as the type of the paper sheet S whose image was detected.

Figure 2:
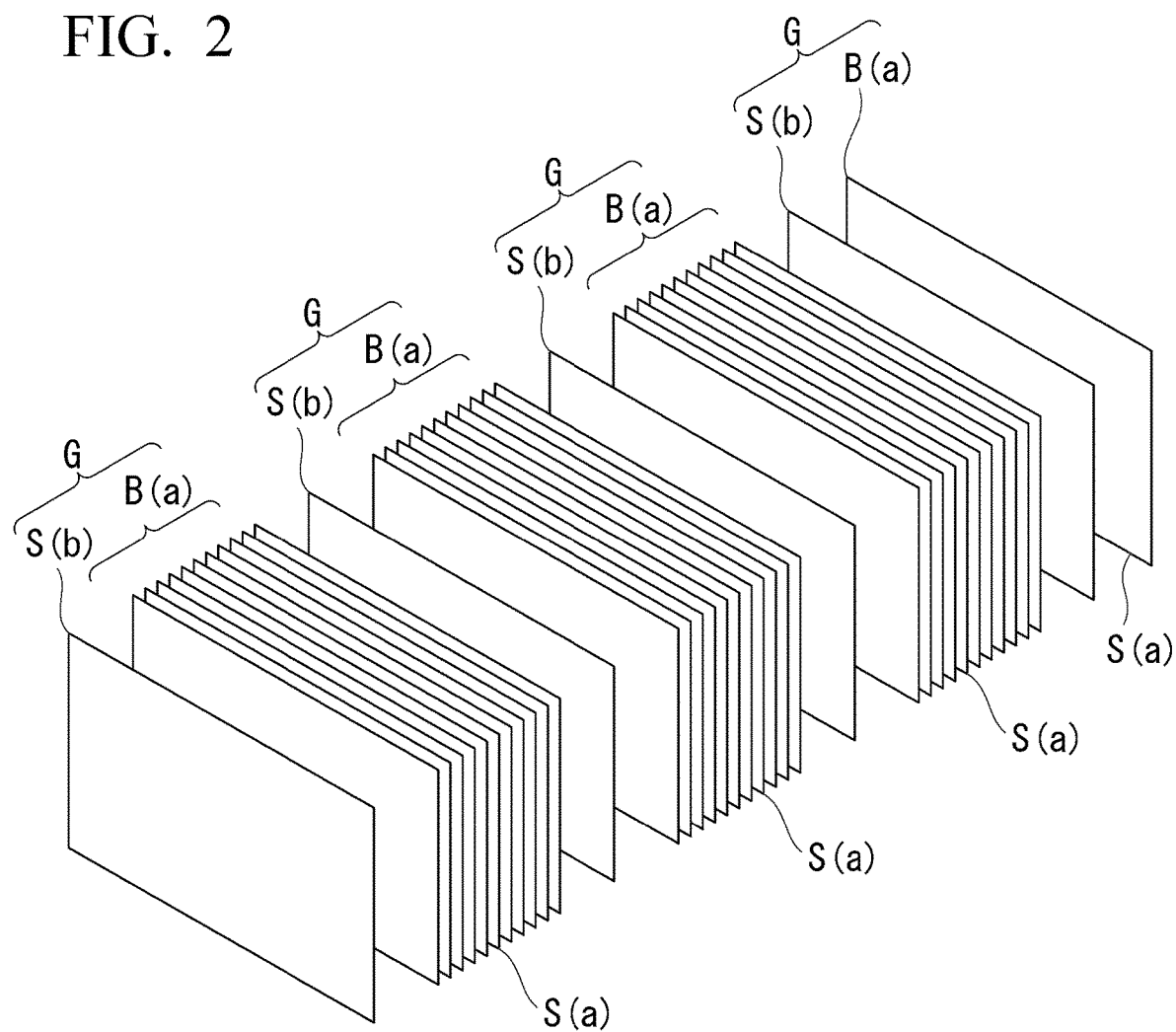
FIG. 2 is a perspective view showing paper sheets processed by the paper sheet processing device according to the embodiment of the present invention.

As shown in FIG. 2, in the paper sheet processing device 1, it is possible to perform batch processing of continuously processing a plurality of division portions B(a) each consisting of a plurality of sheets to be processed S(a), which are a processing target for identification and counting, being continuously stacked in the thickness direction and grouped together. At that time, in order to determine the boundary of each division portion B(a), in other words, in order to divide the division portions B(a), a division card S(b) serving as the paper sheet S is placed at the head position of each division portion B(a).

Figure 3A:
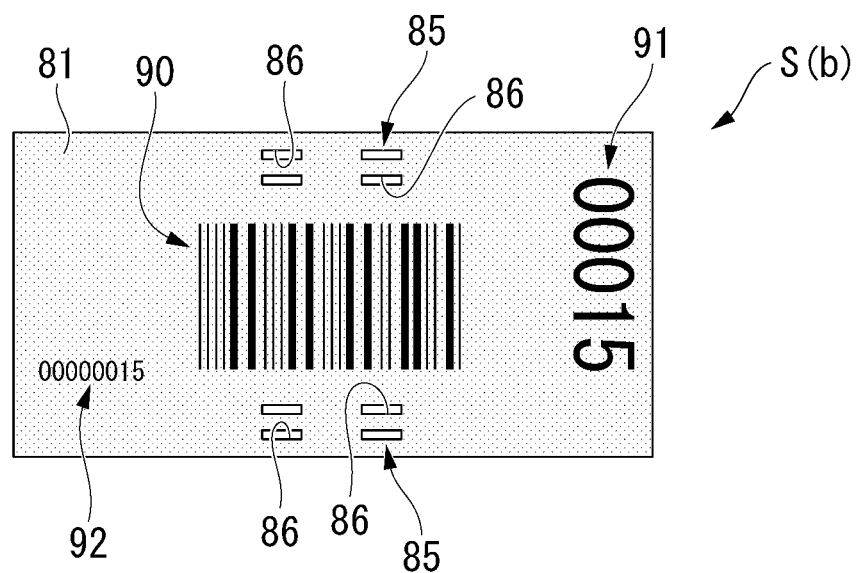
FIG. 3A is a plan view showing the first surface of the division card used by the paper sheet processing device according to the embodiment of the present invention.
Figure 3B:
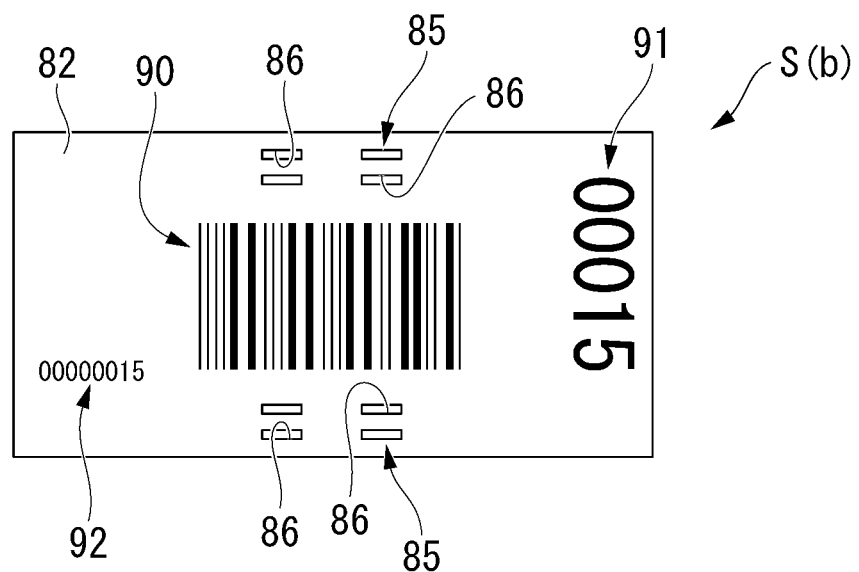
FIG. 3B is a plan view showing the second surface of the division card used by the paper sheet processing device according to the embodiment of the present invention.

The division card S(b) has a first surface 81 and a second surface 82 as shown in FIGS. 3A and 3B. The base colors differ between the first surface 81 and the second surface 82, and the otherwise the same. The base color of the first surface 81 is colored in blue or the like, while the base color of the second surface 82 is colorless, that is, white.

An identification hole group 85 penetrating in the thickness direction is formed at both ends of the division card S(b) in the short side direction and the center portion in the long side direction. Each identification hole group 85 is composed of four identification holes 86. The capture sensor 15 provided in the receiving portion 11 shown in FIG. 1 detects the presence or absence of identification hole groups 85 in the paper sheets S. If the paper sheet S has the identification hole groups 85, the capture sensor 15 detects that the paper sheet S is the division card S(b). If the paper sheet S does not have the identification hole groups 85, the capture sensor 15 detects that the paper sheet S is the paper sheet S(a) to be processed. Moreover, the capture sensor 15 detects conveying abnormalities such as skewing of the division card S(b) from the deviation of the detection timing of each identification hole 86 of the identification hole group 85.

A barcode 90 is printed on the first surface 81 as identification information including a card unique number (unique information) in the central portion in the long side direction and the central portion in the short side direction. The card unique number (unique information) is a card unique number assigned to each division card S(b). The identification information obtained by reading the barcode 90 with a barcode reader includes the card unique number. The card unique number is assigned to the division card S(b) on a one-to-one basis. That is, there is no other division card S(b) having the same card unique number in the division card S(b) for at least the same paper sheet processing device 1.

On the first surface 81, a first text display 91, which is a text display of the card unique number, is printed in the vicinity of one short side. On the first surface 81, a second text display 92, which is a text display of the card unique number, is printed between the other short side and the barcode 90.

The barcode 90, the first text display 91, and the second text display 92 are similarly printed on the second surface 82. The identification hole group 85 that penetrates the division card S(b) in the thickness direction also exists on the second surface 82.

From the above, in the same division card S(b), the barcode 90 on the first surface 81 and the barcode 90 on the second surface 82 are the same. The card unique numbers that can be obtained from these barcodes 90, the card unique number of the first text display 91 on the first surface 81, the card unique number of the second text display 92 on the first surface 81, the card unique number of the first text display 91 on the second surface 82, and the card unique number of the second text display 92 on the second surface 82 are the same.

Explaining with the specific example shown in FIGS. 3A and 3B, when the card unique number included in the identification information of the barcode 90 on the first surface 81 is "00000015", the first text display 91 on the first surface 81 is "00015", and the second text display 92 on the first surface 81 is "00000015". Further, the card unique number included in the identification information of the barcode 90 on the second surface 82 is also "00000015", the first text display 91 on the second surface 82 is "00015", and the second text display 92 on the second surface 82 is "00000015".

Figure 4:
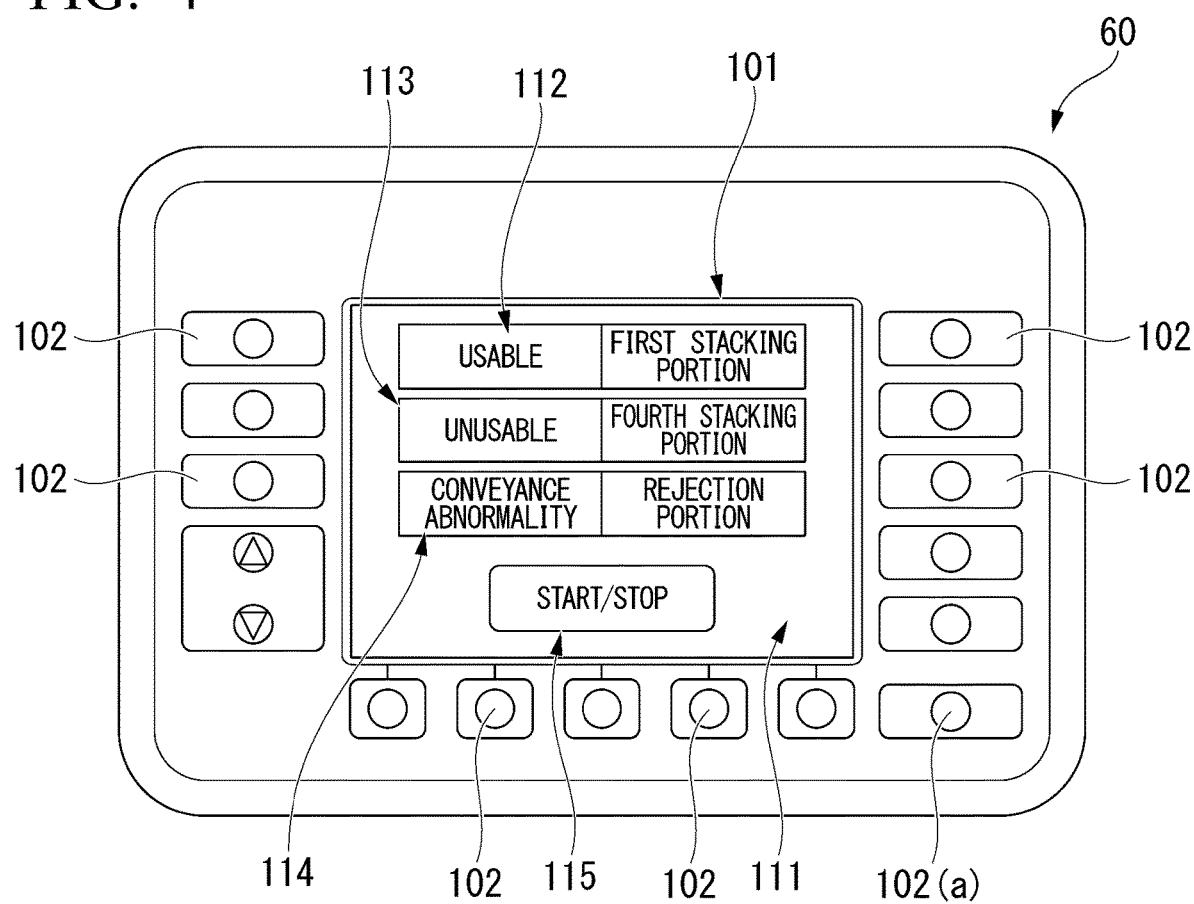
FIG. 4 is a front view showing the operation display portion of the paper sheet processing device according to the embodiment of the present invention.

As shown in FIG. 4, the operation display portion 60 is provided with a touch panel type display screen portion 101 in the center, which displays a screen toward the operator and is pressed by the operator. A plurality of operation switches 102 are provided around the display screen portion 101 of the operation display portion 60. The operation switches 102 are pressed by an operator, and it is detected which operation switch 102 is pressed. A predetermined one of the plurality of operation switches 102 is a card check mode switch 102(a) capable of setting a division card check mode for confirming whether or not the division card S(b) is usable.

At the time of batch processing, as shown in FIG. 2, the division portion B(a) of the paper sheets S(a) to be processed and the corresponding division card S(b) are considered to be one paper sheet group G. A plurality of paper sheet groups G are stacked on the paper sheet processing device 1 and set in the receiving portion 11. At that time, the division card S(b) is set in the receiving portion 11 so as to be located at the lower end in each paper sheet group G When the operation display portion 60 is instructed to start the batch processing, the control portion 62 causes the receiving portion 11 to take in the paper sheets S one by one from the lower end of the paper sheet group G into the paper sheet processing device 1, being conveyed by the in-device conveying portion 58. At that time, on the basis of the identification results of the capture sensor 15 and the identifying and counting portion 22, the control portion 62 stacks rejected paper sheets identified as non-normal paper sheets in the rejection portion 13, among the division card S(b) and the paper sheets S(a) to be processed. Further, the control portion 62, on the basis of the identification results of the capture sensor 15 and the identifying and counting portion 22, classifies and stacks the paper sheets to be counted that were identified as normal paper sheets, among the paper sheets to be processed S(a), in the stacking portions 51 to 54 while performing counting. In this way, the paper sheets S are counted and classified.

In the present embodiment, the paper sheet processing device 1 can execute the division card check mode for confirming whether or not the division card S(b) is usable. The control portion 62 performs a sorting process of sorting division cards S(b) by determining whether or not the division cards S(b) are usable, when the division card check mode is executed.

In the division card check mode, the control portion 62 takes the division card S(b) set in the receiving portion 11 into the paper sheet processing device 1 one by one from the lower end by the receiving portion 11. The captured division card S(b) is conveyed by the in-device conveying portion 58, and is identified by the capture sensor 15 and the identifying and counting portion 22. The control portion 62 determines whether the conveying is normal or abnormal from the identification results of the capture sensor 15 and the identifying and counting portion 22. When the conveying is normal, the control portion 62 determines whether or not the division card S(b) to be identified is usable on the basis of the barcodes 90 on both the front and back sides that were read.

That is, the identifying and counting portion 22 reads a plurality of barcodes 90 including the same card unique number provided on the division card S(b). The control portion 62 determines whether or not the division card S(b) to be identified is usable based on the identification information of the plurality of barcodes 90. The control portion 62 determines whether or not the division card S(b) to be identified is usable on the basis of the card unique numbers obtained from each of the plurality of barcodes 90.

More specifically, the control portion 62 determines that the division card S(b) is usable when the card unique number obtained from the barcode 90 on the first surface 81 and the card unique number obtained from the barcode 90 on the second surface 82 match up in one division card S(b). In other words, in one division card S(b), when the card unique number obtained from one barcode 90 (for example, "00000015") and the card unique number obtained from the other barcode 90 (for example, "00000015") match, the control portion 62 determines that the division card S(b) provided with these barcodes 90 is usable.

When the card unique number obtained from the barcode 90 on the first surface 81 of one division card S(b) and the card unique number obtained from the barcode 90 on the second surface 82 do not match up, the control portion 62 determines that this division card S(b) is unusable. In other words, when the card unique number obtained from one barcode 90 and the card unique number obtained from the other barcode 90 in one division card S(b) do not match up, the control portion 62 determines that the division card S(b) provided with these barcodes 90 is unusable.

Here, in one division card S(b), there are two ways in which the card unique number obtained from one barcode 90 and the card unique number obtained from the other barcode 90 do not match up. That is, there are cases where the card unique numbers can be obtained from both barcodes 90, but these card unique numbers do not match up, and there are cases where the card unique number cannot be obtained from at least one of the barcodes 90.

For example, if the print of the barcode 90 has become faint due to overuse, accurate identification information may not be readable. In such a case, even if the card unique number can be obtained from each of the plurality of barcodes 90, one of the card unique numbers that was read (for example, "00000015") and the other card unique number that was read (for example, "00000014") may not match up. In this case, it can be confirmed that the card unique numbers of both barcodes 90 are not the same number, resulting in a mismatch.

If the print of the barcode 90 becomes even fainter due to overuse or the like, the identification information may not be readable at all. In such a case, while the card unique number (for example, "00000015") can be obtained from one barcode 90, the card unique number cannot be obtained from the other barcode 90, or it may not be possible to obtain the card unique number from both barcodes 90. In these cases, it cannot be confirmed that the card unique numbers of both barcodes 90 are the same numbers, resulting in a mismatch.

The control portion 62 controls the in-device conveying portion 58 to convey the division card S(b) whose conveyance was normal and that was determined to be usable to one of the rejection portion 13, and the stacking portions 51 to 54 and evacuation pocket 55. The division card S(b) determined to be usable is one in which the card unique numbers obtained from each of the plurality of barcodes 90 match up.

The control portion 62 controls the in-device conveying portion 58 to convey the division card S(b) whose conveyance was normal and that was determined to be unusable to the predetermined other one among the rejection portion 13, and the stacking portions 51 to 54 and evacuation pocket 55. The division card S(b) determined to be unusable is one in which the card unique numbers obtained from each of the plurality of barcodes 90 do not match up.

More specifically, the control portion 62 conveys the division card S(b) determined to be usable to the uppermost first stacking portion 51 (first conveying destination) among the stacking portions 51 to 54. On the other hand, the control portion 62 conveys the division card S(b) determined to be unusable to the lowermost fourth stacking portion 54 (second conveying destination) among the stacking portions 51 to 54.

For the division card S(b) whose conveyance was abnormal, the control portion 62 controls the in-device conveying portion 58 regardless of the acquisition result of the card unique number included in the barcode 90 to convey the division card S(b) to the rejection portion 13 (fifth conveying destination), which is the predetermined other one among the rejection portion 13, and the stacking portions 51 to 54 and evacuation pocket 55.

Based on the above, the division card S(b) whose conveyance is normal and that was determined to be usable is accommodated in the first stacking portion 51. The division card S(b) whose conveyance is normal and that was determined to be unusable is accommodated in the fourth stacking portion 54. The division card S(b) with a conveyance abnormality is accommodated in the rejection portion 13.

When the card check mode switch 102(*a*) of the operation display portion 60 shown in FIG. 4 is pressed, the control portion 62 sets the paper sheet processing device 1 to the division card check mode. Then, the control portion 62 displays the card check mode screen 111 as shown in FIG. 4 on the display screen portion 101 of the operation display portion 60. In the card check mode screen 111, the usable accommodation destination display 112, the unusable accommodation destination display 113, the conveyance abnormality accommodation destination display 114, and the start/stop operation switch display 115 are displayed. The usable storage destination display 112 indicates the accommodation destination of the division card S(b) that is normally conveyed and usable. The unusable accommodation destination display 113 indicates the accommodation destination of the division card S(b) that is normally conveyed and unusable. The conveyance abnormality accommodation destination display 114 indicates the accommodation destination of the division card S(b) with a conveyance abnormality.

More specifically, in order to convey the division card S(b) determined to be usable to the first stacking portion 51, the text "usable" and "first stacking portion" is displayed in the usable accommodation destination display 112. In order to convey the division card S(b) determined to be unusable to the fourth stacking portion 54, the text "unusable" and "fourth stacking portion" are displayed in the unusable accommodation destination display 113. Moreover, in order to convey the division card S(b) having a conveyance abnormality to the rejection portion 13, the text "conveyance error" and "rejection portion" are displayed in the conveyance abnormality accommodation destination display 114.

After the card check mode switch 102(*a*) of the operation display portion 60 is pressed, when the start/stop operation switch display 115 is pressed on the card check mode screen 111, or the start/stop operation switch (not shown) provided on the front surface other than the operation display portion 60 of the counting unit 2 is pressed, the control portion 62 causes the division cards S(b) set in the receiving portion 11 to be taken into the paper sheet processing device 1 one by one by the receiving portion 11. Subsequently, the control portion 62 conveys the division cards S(b) taken in by the in-device conveying portion 58, and causes the capture sensor 15 and the identifying and counting portion 22 to identify the division cards S(b).

From the identification results of the capture sensor 15 and the identifying and counting portion 22, the control portion 62 determines whether the division card S(b) is normally conveyed and usable, normally conveyed and unusable, or conveyed abnormally. The control portion 62 conveys the division card S(b) that is normally conveyed and usable to the first stacking portion 51 by the in-device conveying portion 58. The control portion 62 conveys the division card S(b) that is normally conveyed but unusable to the fourth stacking portion 54 by the in-device conveying portion 58. Further, the control portion 62 conveys the division card S(b) having a conveyance abnormality to the rejection portion 13 by the in-device conveying portion 58. In this way, the control portion 62 sorts and classifies division cards S(b) according to whether they are normally conveyed and usable, normally conveyed and unusable, or have a conveyance abnormality, and accommodates the division cards S(b) in the first stacking portion 51, the fourth stacking portion 54, and the rejection portion 13.

When all the division cards S(b) set in the receiving portion 11 have been conveyed and accommodated in any of the first stacking portion 51, the fourth stacking portion 54, and the rejection portion 13, the control portion 62 notifies the operator by the following message. That is, the control portion 62 causes the display screen portion 101 to display a message to the effect that the division card S(b) of the "first stacking portion" is usable, and the division card S(b) of the "fourth stacking portion" is unusable. At the same time, the control portion 62 causes the speech output portion 61 to output a message to the effect that the division card S(b) of the "fourth stacking portion" is unusable.

If there is a division card S(b) in the rejection portion 13, the control portion 62 notifies the operator or the like by the following message. That is, the control portion 62 displays in the display screen portion 101 a message prompting the division card S(b) conveyed to the rejection portion 13 to be set in the receiving portion 11 again so as to perform the sorting process again, and outputs the message from the speech output portion 61 to notify the operator.

According to the paper sheet processing device 1 of the embodiment described above, when reading a plurality of barcodes 90 including the same card unique number provided on the division card S(b), the identifying and counting portion 22 detects whether or not the card unique numbers obtained from each of the barcodes 90 match up. When the card unique numbers obtained from each of the plurality of barcodes 90 match up, the control portion 62 determines the division card S(b) provided with these barcodes 90 to be usable. On the other hand, when the card unique numbers obtained from each of the plurality of barcodes 90 do not match up, the control portion 62 determines the division card S(b) provided with these barcodes 90 to be unusable. In this way, since whether the division card S(b) is usable or not is determined on the basis of the matching up or non-matching up of the card unique numbers of the plurality of barcodes 90 provided on the division card S(b), it is possible to easily determine whether the division card S(b) is usable or not.

Further, when the card unique numbers obtained from each of the plurality of barcodes 90 match up, the control portion 62 conveys the division card S(b) provided with these barcodes 90 to the first stacking portion 51. When the card unique numbers obtained from each of the plurality of barcodes 90 do not match up, the control portion 62 conveys the division card S(b) provided with these barcodes 90 to the fourth stacking portion 54. The control portion 62 sorts the division cards S(b) in this way. Therefore, unusable division cards S(b) can be automatically separated from usable division cards S(b). Accordingly, it becomes easy to eliminate unusable division cards S(b).

Further, in the case of a conveyance abnormality, the control portion 62 conveys the division card S(b) to the rejection portion 13 regardless of the acquisition result of the card unique number obtained from the barcode 90. Therefore, since division cards S(b) having a conveyance abnormality can be separated from usable division cards S(b) and unusable division cards S(b), the operation for the re-sorting process of division cards S(b) with a conveyance abnormality becomes easy.

The paper sheet processing device 1 is provided with a card check mode switch 102(*a*) as an operation portion capable of setting a division card check mode for confirming whether or not the division card S(b) is usable. When the division card check mode is set by the card check mode switch 102(*a*), the control portion 62 determines whether or not the division card S(b) is usable. Therefore, the division card check mode for confirming whether or not the division card S(b) is usable can be easily executed.

Further, since the division card S(b) is provided with a plurality of barcodes 90, it is possible to make the division card S(b) have various pieces of information including the card unique number.

The above embodiment shows an example of the paper sheet processing device 1 conveying to the first stacking portion 51 a usable division card S(b) that was normally conveyed, conveying to the fourth stacking portion 54 an unusable division card S(b) that was normally conveyed, and conveying to the rejection portion 13 a division card S(b) that has a conveyance abnormality. However, the present invention is not limited thereto, and for example, by operating the operation display portion 60, the conveying destination can be arbitrarily set from among the rejection portion 13, the stacking portions 51 to 54, and the evacuation pocket 55.

As described above, in the same one division card S(b), there are two ways in which the card unique number obtained from one barcode 90 and the card unique number obtained from the other barcode 90 do not match up. Although the control portion 62 was able to obtain the card unique numbers from each of the barcodes 90 on both sides, in cases in which these card unique numbers do not match up, and cases where the card unique number could not be obtained from at least one barcode 90, the conveying destination of the division card S(b) may be changed so as to sort the division card S(b). For example, if the card unique numbers could be obtained from each of the plurality of barcodes 90 but these card unique numbers do not match up, the control portion 62 may convey the division card S(b) provided with these barcodes 90 to the third stacking portion 53 (third conveying destination), which is the third from the top of the stacking portions 51 to 54. If the card unique number cannot be obtained from at least one of the plurality of barcodes 90, the control portion 62 may convey the division card S(b) provided with these barcodes 90 to the fourth stacking portion 54 from the top (fourth conveying destination).

In this way, assuming the card unique numbers obtained from each of the plurality of barcodes 90 do not match up, when the card unique numbers could be obtained from each of the plurality of barcodes 90 but do not match up, the control portion 62 can sort the division card S(b) by conveying the division card S(b) to the third stacking portion 53, and when the card unique number could not be obtained from at least one of multiple barcodes 90, the control portion 62 can sort the division card S(b) by conveying the division card S(b) to the fourth stacking portion 54. By sorting in this way, it becomes easy to classify unusable division cards S(b) in detail.

It is also possible to change the paper sheet processing device 1 of the above-described embodiment as described in the following modifications 1 to 9.

<Modification 1>

In the same division card S(b), a plurality of barcodes 90 may be provided on each of both surfaces of the first surface 81 and the second surface 82 (for example, two on the first surface 81 and two on the second surface 82). For example, when the card unique numbers obtained from each of all the barcodes 90 match up, the division card S(b) provided with these barcodes 90 is conveyed to the first stacking portion 51. When the card unique number can be obtained from all the barcodes 90 and the card unique number obtained from at least one barcode 90 and the card unique numbers obtained from the remaining barcodes 90 do not match up, the division card S(b) provided with these barcodes 90 is conveyed to the third stacking portion 53. Moreover, when the card unique number cannot be obtained from at least one of all the barcodes 90, the division card S(b) provided with these barcodes 90 is conveyed to the fourth stacking portion 54.

<Modification 2>

The identifying and counting portion 22 reads the barcodes 90 on both surfaces of the first surface 81 and the second surface 82 of the division card S(b), and may read at least either one card unique number of the first text display 91 and the second text display 92 provided on both surfaces of the first surface 81 and the second surface 82. For example, when the card unique number obtained from the barcode 90 on both surfaces and the card unique number read from the first text display 91 provided on both surfaces and the second text display 92 provided on both surfaces all match up, the division card S(b) provided with these is conveyed to the first stacking portion 51. Further, a card unique number can be obtained from the barcode 90 on both surfaces, the first text display 91 on both surfaces, and the second text display 92 on both surfaces, and when at least one of these card unique numbers does not match up with the remaining card unique numbers, the division card S(b) provided with these is conveyed to the third stacking portion 53. Further, if at least one card unique number among the barcodes 90 on both surfaces, the first text display 91 on both surfaces, and the second text display 92 on both surfaces cannot be obtained, the division card S(b) provided with these is conveyed to the fourth stacking portion 54.

<Modification 3>

The division card S(b) may be provided with a QR code (registered trademark) instead of the barcode 90 as identification information. For example, when the card unique numbers obtained from each of the QR codes on both surfaces match up, the division card S(b) provided with these QR codes is conveyed to the first stacking portion 51. If the card unique number can be obtained from each of the QR codes on both surfaces, and the card unique number obtained from one QR code does not match up with the card unique number obtained from the other QR code, the division card S(b) provided with these barcodes 90 is conveyed to the third stacking portion 53. Moreover, when the card unique number cannot be obtained from at least one of the QR codes on both surfaces, the division card S(b) provided with these QR codes is conveyed to the fourth stacking portion 54.

A QR code may be provided together with the barcode 90. For example, when all the card unique numbers obtained from the barcodes 90 on both surfaces and the QR codes on both surfaces match up, the division card S(b) provided therewith is conveyed to the first stacking portion 51. If the card unique number can be obtained from each of the barcodes 90 on both surfaces and the QR codes on both surfaces, and the card unique number of at least one of them does not match up with the remaining card unique numbers, the division card S(b) provided with the above is conveyed to the third stacking portion 53. Further, when at least one card unique number of the barcodes 90 on both surfaces and the QR codes on both surfaces cannot be obtained, the division card S(b) provided with these is conveyed to the fourth stacking portion 54.

<Modification 4>

The control portion 62 may display in the operation display portion 60, as well as output from the speech output portion 61, a message urging the division cards S(b) determined to be usable and conveyed to the first stacking portion 51 to be again charged into the receiving portion 11 to again perform the sorting process for determining whether or not the division cards S(b) are usable. That is, the sorting process for determining whether or not the division card S(b) is usable is performed twice. Thereby, an unusable division card S(b) can be sorted more reliably by repeatedly performing the sorting process.

<Modification 5>

The paper sheet processing device 1 may register the determination result of whether or not the division card S(b) is usable in the storage portion 63 of the paper sheet processing device 1 or a higher-level device of the paper sheet processing device 1.

<Modification 5-1>

As described above, the paper sheet processing device 1 executes the division card check mode that confirms whether or not the division card S(b) is usable to determine whether or not the division card S(b) is usable. The division card S(b) found to be usable by this determination may be registered as a usable division card in the storage portion 63 of the paper sheet processing device 1 or a higher-level device of the paper sheet processing device 1. The division card S(b) found to be unusable by this determination may be registered as an unusable division card in the storage portion 63 of the paper sheet processing device 1 or a higher-level device of the paper sheet processing device 1.

That is, the division card S(b) determined to be usable as a result of executing the division card check mode is registered as a usable division card in the storage portion 63 or the higher-level device of the paper sheet processing device 1 in the storage portion 63 or the higher-level device of the paper sheet processing device 1 together with the card unique number being registered in the storage portion 63 or the higher-level device of the paper sheet processing device 1. Moreover, the division card S(b) determined to be unusable is conveyed to the rejection portion 13. The operator inputs the card unique number of the division card conveyed to the rejection portion 13 by using the numeric keypad displayed on the operation display portion 60 of the paper sheet processing device 1. Next, by pressing the delete button displayed on the operation display portion 60, the operator registers the card unique number of the division card determined to be unusable in the storage portion 63, and registers the division card determined to be unusable in the storage portion 63 as an unusable division card.

The card unique number of the division card conveyed to the rejection portion 13 may be registered in the higher-level device connected to the paper sheet processing device 1. In this case, the operator inputs the card unique number of the division card conveyed to the rejection portion 13 from the operation portion of the higher-level device. Next, by pressing the delete button provided on the operation portion of the higher-level device, the operator registers the card unique number of the division card determined to be unusable in the higher-level device, and registers the division card determined to be unusable in the higher-level device as an unusable division card.

<Modification 5-2>

The above modification 5-1 shows an example of registering a card unique number of an unusable division card. However, as a result of executing the division card check mode, the card unique number of the division card determined to be unusable may be deleted from registered card unique numbers to be made an unregistered card unique number. That is, the division card determined to be unusable is treated as an unregistered division card.

As a result of storing the determination result of whether or not the division card is usable as described above, upon detecting an unusable division card or the card unique number of a division card that is not registered as usable during normal deposit business, the paper sheet processing device 1 displays in the operation display portion 60 an error message of erroneous recognition or improper use of a barcode to notify the operator and suspends the deposit operation.

<Modification 6>

The operation history of the division card may be used to determine whether or not the division card is usable. As the operation history of the division card, the number of times the division card has been used or the number of defects during conveyance (jam, rejection) can be used as follows.

<Modification 6-1>

Not all division cards are used in normal deposit operations, with some cards being randomly selected and used. Accordingly, there is a possibility that each division card will have a large difference in the number of times it is used. It is considered that the larger the number of uses, the greater the wear deterioration. Therefore, the control portion 62 of the paper sheet processing device 1 counts the number of times of use corresponding to the card unique number of the division card during normal deposit operations, and stores the count value in the storage portion 63. When the control portion 62 executes the division card check mode to determine whether or not the division card S(b) is usable, the control portion 62 sorts for rejection those division cards having a history in which the count value exceeds a predetermined number of times, and notifies the operator that the division card should be replaced.

Moreover, the control portion 62 sorts for rejection the first division card that has been used a predetermined number of times or more, and notifies the operator that the division card should be replaced. At the same time, the control portion 62 may sort and store division cards used fewer than a first predetermined number of times and used a second predetermined number of times or more, and division cards used fewer than the second predetermined number of times, and may notify the operator to preferentially use cards that have been used fewer than the second predetermined number of times.

<Modification 6-2>

In the above modification 6-1, the number of times the division card was used was stored as the operation history of the division card. In this modification 6-2, instead, the number of defective conveyances of a division card is used. The number of defective conveyances is the number of jams, rejections, etc. that occur when conveying a division card.

It can be considered that the greater the number of times jams, rejects, etc. occur in a division card that is not normally conveyed in the paper sheet processing device 1, the greater the wear and deterioration of the division card. Therefore, the control portion 62 of the paper sheet processing device 1 counts the number of defective conveyances corresponding to the card unique number of the division card during normal deposit operations, and stores the count value in the storage portion 63. When the control portion 62 executes the division card check mode to determine whether or not the division card S(b) is usable, the control portion 62 selects for rejection those division cards having a history in which the count value exceeds a predetermined number of times and notifies the operator that the division card should be replaced.

<Modification 7>

In the above embodiment, barcodes printed on both surfaces of the division card are used as an identification element in order to determine whether or not the division card is usable. Instead, the size and spacing of the identification holes 86 formed in the division card may be used as the identification element.

The control portion 62 of the paper sheet processing device 1 checks the size or spacing of the identification holes 86 in the division card when executing the division card check mode. The control portion 62 compares the size or spacing of the identification holes 86 with a reference size or reference spacing of the identification holes 86 stored in advance in the storage portion 63 or a higher-level device of the paper sheet processing device 1, and when the size or spacing is deformed or enlarged beyond the permissible range, the division card is sorted for rejection. This makes it possible to notify the operator that the deteriorated division card should be replaced.

Instead of using the barcode printed on the division card as the identification element, the color of the division card itself may be used as the identification element.

The control portion 62 of the paper sheet processing device 1 checks the color of the division card when executing the division card check mode. The control portion 62 compares the color of the division card with a reference color of the division card stored in advance in the storage portion 63 or the higher-level device of the paper sheet processing device 1, and when the color of the division card is discolored more than the permissible range, sorts that division card for rejection. This makes it possible to notify the operator that the deteriorated division card should be replaced.

<Modification 8>

In the above embodiment, in order to determine whether or not the division card is usable, the determination is made based on whether or not the reading results of the barcodes printed on both surfaces of the division card match up. Alternatively, it is possible to use whether or not a reading error occurred when reading the barcodes printed on the division card and correction of the reading error was required.

That is, a distinction is made as to whether the barcode could be easily read when reading the barcode, or whether the barcode needs error correction and cannot be easily read. More specifically, a determination is made that an error has occurred when the thick and thin lines of bars making up the barcode have partially faded or disappeared, or a line that should be partially absent is read as existing due to grime between a bar and a space. However, even in such a case, a location that is partially faded or has disappeared can be read as a normal bar line by error correction. Similarly, even if there is a line between the bar and the space that should be partially absent but exists due to grime between a bar and a space, the line can be read normally by performing error correction that regards this location as "grime".

In this way, if error correction is required to read a barcode, the number of error corrections will be counted as the number of NGs in association with the card unique number of the division card. When the number of times a division card is NG becomes equal to or greater than a predetermined number of times, the control portion 62 sorts that division card for rejection. This makes it possible to notify the operator that a deteriorated division card should be replaced.

<Modification 9>

The identification hole group 85 of the division card may be composed of at least one identification hole 86.

At least one identification hole group 85 of the division card S(b) may be formed at at least one end in the short-side direction.

The division card may be coated with a laminate, plastic, or the like in order to prevent the division card from becoming dirty or worn.

Alternatively, the division card may be made of a synthetic resin such as a polymer instead of paper. In doing so, both surfaces of the division card are constituted by coloring a transparent synthetic resin sheet.

Moreover, the identifying portion provided in the division card and composed of the identification hole group 85 may be composed of a non-colored portion instead of the through hole 86.

INDUSTRIAL APPLICABILITY

The present invention can be applied to a paper sheet processing device using a division card, and can easily determine whether or not the division card is usable.

DESCRIPTION OF THE REFERENCE SYMBOLS

1: Paper sheet processing device
13: Rejection portion (fifth conveying destination)
15: Capture sensor (identifying portion)
22: Identifying and counting portion (identifying portion)
51: First stacking portion (first conveying destination)
53: Third stacking portion (third conveying destination)
54: Fourth stacking portion (second conveying destination, fourth conveying destination)
62: Control portion
90: Barcode (identification information)
102(*a*): Card check mode switch (operation portion)
S(b): Division card

DRAWINGS

FIG. 1
AA Left
BB Right
FIG. 2
FIG. 3A
FIG. 3B
FIG. 4
AA Usable
BB First stacking portion
CC Unusable
DD Fourth stacking portion
EE Conveyance abnormality
FF Rejection portion
GG Start/stop

The invention claimed is:

1. A paper sheet processing device comprising:
an identifying sensor that reads a plurality of pieces of identification information including barcode and text display representing same unique information provided to a division card;
a capture sensor that detects presence or absence of an identification hole provided on the division card; and
for the division card in which the presence of the identification hole has been detected by the capture sensor, a controller that determines that the division card is usable when all of the unique information obtained from each of the barcode and the text display match up and conveys the division card to a first conveying destination to sort the division card, and that determines that the division card is unusable when at least one of the unique information obtained from each of the barcode and the text display does not match up and conveys the division card to a second conveying destination to sort the division card.

2. The paper sheet processing device according to claim 1, wherein assuming the at least one of the unique information obtained from each of the barcode and the text display does not match up, the controller sorts the division card by conveying the division card to a third conveying destination when the unique information could be obtained from each of the barcode and the text display but does not match up, and sorts the division card by conveying the division card to a fourth conveying destination when the unique information could not be obtained from at least one of the barcode and the text display.

3. The paper sheet processing device according to claim 1, wherein the controller conveys the division card to a fifth conveying destination regardless of the acquisition result of the unique information when an abnormality is detected in the conveyance of the division card.

4. The paper sheet processing device according to claim 1, further comprising an operation switch that sets a division card check mode for confirming whether or not the division card is usable,
wherein the controller determines whether or not the division card is usable in the division card check mode.

* * * * *